Dec. 21, 1965  G. L. M. BEUREL  3,224,729
SHEET METAL SECTIONAL GATE VALVES
Filed Jan. 28, 1965  2 Sheets-Sheet 1
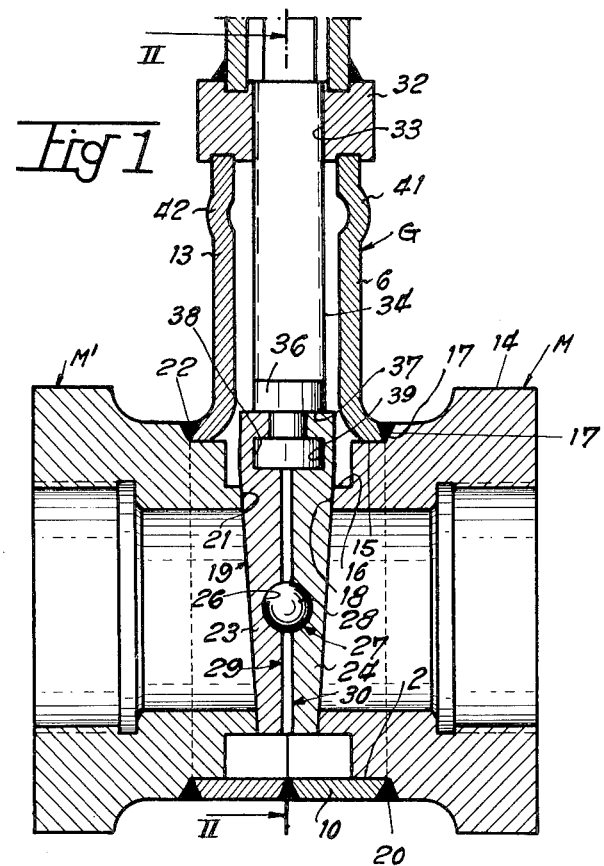
INVENTOR
GUY LUCIEN MARIUS BEUREL
BY
Woodhams, Blanchard and Flynn
ATTORNEYS

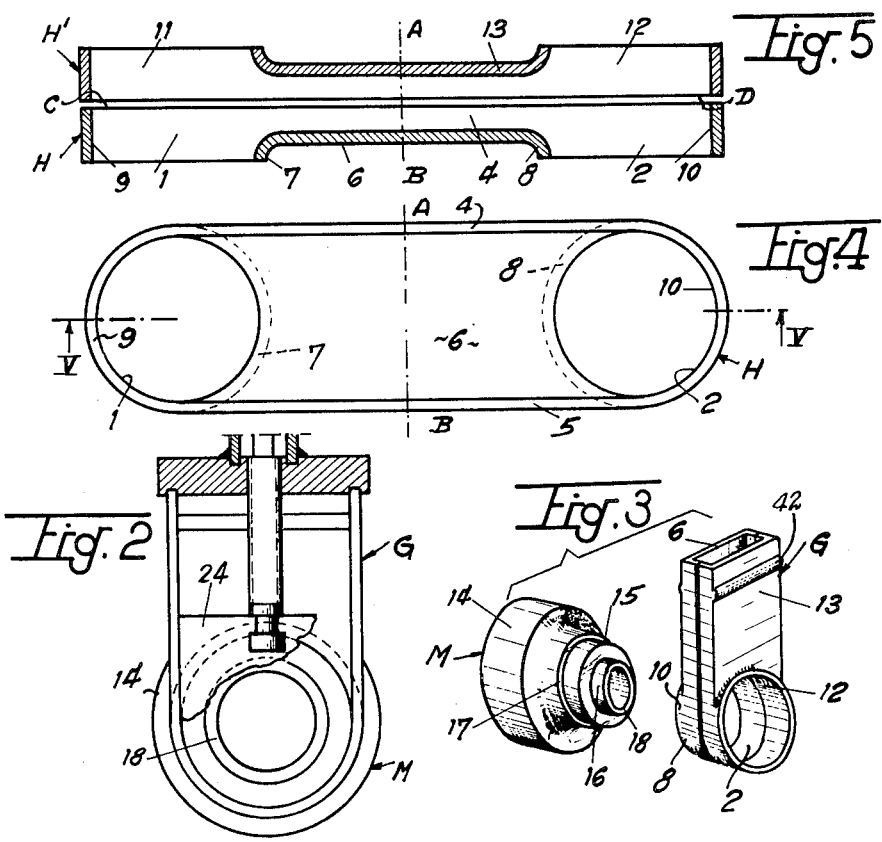

United States Patent Office 3,224,729
Patented Dec. 21, 1965

3,224,729
SHEET METAL SECTIONAL GATE VALVES
Guy Lucien Marius Beurel, 46 Ave. A. Briand,
La Frette-sur-Seine, France
Filed Jan. 28, 1965, Ser. No. 428,756
Claims priority, application France, Oct. 26, 1959,
808,436, Patent 1,253,841
2 Claims. (Cl. 251—327)

This application is a continuation-in-part of my co-pending patent application Serial No. 64,831, filed October 25, 1960, and entitled "Gate Valves," now abandoned. The invention disclosed in this application relates to gate valves and more specifically to valve bodies.

It is of particular importance that valves which are utilized in piping for industrial installation, more specially in chemical plants, be of as low cost as possible while being as strong as the more expensive valves in use.

It is also of particular interest that such valves be resistant to corrosion by corrosive fluids, such as acids or acid solutions, and that such valves be made of non-corrodible metal or alloy, such as stainless steel of various grades.

The known valves of this kind are generally obtained by assembling together elements which have been made by forging or similar expensive operations, and such elements must be machined before assembly thereof. Moreover, said elements must be assembled on a support frame or former after which a number of welding operations are necessary, and such operations are usually performed manually.

Thus, it is an object of this invention to provide an inexpensive gate valve which has adequate strength and which has a body formed by welding together two half shells, each of which is obtained by stamping a metal sheet.

Another object of this invention is to provide a gate valve body, of this type, comprising the gate guide and a pair of one-piece, tubular seat and coupling members welded to the half shells and extending through openings thereof, so that careful pre-positioning of these parts is not necessary before welding, and only three welds are required to fully assemble the gate valve body.

Still another object of this invention is to provide a gate valve body which will perform as satisfactorily as the more expensive gate valves.

Other objects and further advantages of my invention will be better understood from the following description of the drawings, in which:

FIGURE 1 is a central, cross-sectional view of a gate valve provided with a gate valve body in accordance with this invention.

FIGURE 2 is a sectional view taken along the line II—II in FIGURE 1.

FIGURE 3 is an exploded, perspective view of the gate guide and one tubular seat and coupling member of a valve body in position to be assembled together.

FIGURE 4 is a plan view of a metal stamping from which the gate guide is made according to this invention.

FIGURE 5 is a sectional view of two metal stampings taken along the line V—V in FIGURE 4 and positioned to be welded together to obtain two gate guides.

A gate valve body according to my invention is obtained by stamping two pieces of sheet metal to form two identical, oblong half shells H and H', one of which is shown in plan view in FIGURE 4. Each of these half shells has an opening near its opposite longitudinal ends, and each half shell is symmetrical on opposite sides of a plane of symmetry A-B, which passes transversely through said half shell midway between said openings.

The central portion of said half shells H (FIGURES 4 and 5) has a substantially U-shaped transverse cross section between the openings 1 and 2. The U-shape is formed by two sides 4 and 5 and by a central web 6. The lower plane defined by the outlets of the openings 1 and 2 is somewhat offset with respect to the external surface of the web 6 so that said openings 1 and 2 are encircled by outwardly extending flanges 7 and 8, respectively. In producing this structure, it is essential that the height of the walls 9 and 10, which include the flanges 7 and 8, are constant and of a predetermined value.

As shown by FIGURE 5, two identical half shells H and H' are disposed in opposing and abutting relation. The openings 1 and 2 are respectively aligned with the openings 11 and 12, after which the shells H and H' are welded together along their abutting edges C and D, the webs 6 and 13 being disposed so that the U-shaped portions open toward each other. From a mere inspection of said FIGURE 5, it is evident that said half shells can be stamped and welded together by completely automatic machinery.

The welded half shells are then cut along the transverse plane A-B to divide same into two identical gate guides such as the gate guide G shown by FIGURE 3. The webs 6 and 13 may be provided when offset, with transverse ribs 41 and 42, respectively, near their upper ends for strengthening purposes.

In each of the openings 1, 2, 11 and 12 is inserted a one-piece tubular seat and coupling member, one of which is shown at M in FIGURE 3. The seat and coupling member is formed with a large outer flange 14 of larger external diameter than the corresponding opening 2 in flange 8, an intermediate portion 15 of substantially the same external diameter as said opening 2, and an inner portion 16 of smaller diameter than said intermediate portion 15. Thus, a substantially radially extending shoulder 17 is formed between the portions 14 and 15. The inner axial end 18 of said coupling member is slightly inclined to its axis and constitutes, with the corresponding inner axial end 21 of another similar coupling member M', a pair of seats for a conventional valve gate 19, shown in FIGURE 1.

In order to achieve the assembly of the gate valve body, the small portion 16 of the seat and coupling member M is simply inserted into the corresponding opening 2. The intermediate portion 15 snugly fits within the flange 8 around the opening 2, and the outer end of the flange 8 abuts against the shoulder 17. A machine-welding operation can then provide the weld 20. As the wall 10 is of a constant and predetermined height, the inner seat 18 of the coupling member M is automatically located at a predetermined position with respect to, and at a predetermined distance from, the corresponding inner seat 21 on the other coupling member M'.

Said coupling member M' may be and preferably is, identical with the coupling member M just described, and said member M' is set into place in the same manner and secured by means of the weld 22 to the gate guide G.

As stated previously, the half shells are identical and, particularly, the flanges 7, 8 and the walls 9, 10 have the same height. Thus, it is apparent that, when the welds 20 and 22 are achieved, the inner ends or seats 18 and 21 of the two coupling members M and M' are in predetermined, relative positions and at predetermined distances form each other. Moreover, this positioning is accomplished without any machining. By proper location of the coupling members M and M', the sloped seats 18 and 21 will be engaged by the opposite, sloped faces of the gate 19.

In this particular embodiment, the gate 19 is comprised of a pair of substantially identical, spaced and downwardly tapered plates 23 and 24 having opposing, substantially semispherical recesses 26 and 27 in their opposing faces. A spherical bearing member 28 is disposed within said recesses 26 and 27 so that the opposing faces 29 and 30 of said plates 23 and 24, respectively, are spaced somewhat from each other.

A gate supporting block 32 is secured, as by welding, to the upper end of the gate guide G and is provided with a centrally located, internally threaded opening 33. A screw 34 is threadedly received within the threaded opening 33 and has at its lower end an unthreaded portion 36 with an annular groove 37 therein. The opposing faces 29 and 30 of the plates 23 and 24 are provided with opposing semicylindrical grooves 38 and 39, respectively, into which the lower end of the unthreaded portion 36 of the screw 34 is rotatably and snugly received when said plates 23 and 24 are in their spaced positions. The grooves 38 and 39 have upward extensions of reduced diameter through which the screw 34 extends.

Accordingly, upward and downward movement of the gate 19 can be effected by rotating the screw 34, whereby opening and closing, respectively, of the gate valve of this invention is effected.

Although a particular preferred embodiment of the invention has been disclosed above for illustrative purposes, it will be understood that variations or modifications of such disclosure, which come within the scope of the appended claims, are fully contemplated.

What I claim is:

1. A gate valve construction comprising:
   a gate guide consisting of two identical elongated half shells of sheet metal disposed in opposing abutting relation and welded together along complementary registering planar edge portions so as to provide a peripheral seam in the plane of the juncture, said half shells being of substantially U-shaped transverse cross section so that they form a hollow chamber therebetween said half shells each having an integral, annular, outwardly bent flange adjacent one longitudinal end thereof and forming the wall of a circular opening, said openings being coaxial and said flanges being aligned and extending away from each other, said flanges having planar outer edges which are parallel with said plane of juncture and are spaced equal distances therefrom and are disposed on opposite sides thereof;
   a pair of identical one-piece tubular seat and coupling members each of which is disposed in one of said openings, each said seat and coupling member having an enlarged outer portion of larger diameter than its associated opening and disposed outwardly thereof, an intermediate portion of substantially the same external diameter as the diameter of its associated opening and snugly contacting the wall of its associated opening, and an inner portion of smaller diameter than said intermediate portion, said inner portions of said members having opposing spaced-apart end faces defining opposing valve seats one on each side of said plane of juncture, each member having a substantially radially extending annular shoulder between said outer portion and said intermediate portion, said shoulder being radially overlapped with, disposed outside of, and abutting said outer edge of the flange of its associated opening, and welded joints between said shoulders and said outer edges whereby said members are united to said gate guide;
   a gate disposed between said valve seats and adapted for simultaneous sealing engagement therewith; and
   operating means disposed in said chamber for moving said gate toward and away from said valve seats.

2. A gate valve construction comprising:
   a gate guide consisting of two half shells of sheet metal disposed in opposing abutting relation and welded together along complementary registering edge portions, said half shells forming a hollow chamber therebetween and each of said half shells having an integral, annular outwardly bent portion defining a flange forming the wall of an opening, said openings being coaxial and said flanges being aligned and extending away from each other and having planar outer edges which are parallel with the central plane of said chamber;
   a pair of tubular seat and coupling members each of which is disposed in one of said openings, each said seat and coupling member having an enlarged outer portion of larger diameter than its associated opening and disposed outwardly thereof, an intermediate portion of substantially the same external diameter as the diameter of its associated opening and snugly contacting the wall of its associated opening, and an inner portion of smaller diameter than said intermediate portion, said inner portions of said members having opposed spaced-apart end faces defining opposing valve seats, each member having a substantially radially extending annular shoulder between said outer portion and said intermediate portion, said shoulder being radially overlapped with, disposed outside of and abutting said outer edge of the flange of its associated opening, and weld joints between said shoulders and said outer edges whereby said members are united to said gate guide;
   a gate disposed between said valve seats and adapted for simultaneous sealing engagement therewith; and
   operating means disposed in said chamber for moving said gate toward and away from said valve seats.

References Cited by the Examiner

UNITED STATES PATENTS

| 738,362 | 9/1903 | Schmitt | 251—195 |
| 2,514,532 | 7/1950 | Allen | 251—329 X |
| 2,656,143 | 10/1953 | Fantz | 251—327 |
| 2,868,495 | 1/1959 | Lucas | 251—327 X |
| 3,032,310 | 5/1962 | Hansen | 251—327 |

FOREIGN PATENTS

| 593,758 | 3/1960 | Canada. |
| 190,374 | 12/1922 | Great Britain. |

ISADOR WEIL, *Primary Examiner.*

CLARENCE R. GORDON, *Examiner.*